US009465954B1

(12) United States Patent
Speedie et al.

(10) Patent No.: US 9,465,954 B1
(45) Date of Patent: Oct. 11, 2016

(54) METHOD AND SYSTEM FOR TRACKING MASKING OF DATA

(71) Applicant: Dataguise Inc., Fremont, CA (US)

(72) Inventors: Malcolm Speedie, Cannington (AU); Ghanaya Singh, Chandigarh (IN); Subramanian Ramesh, San Jose, CA (US)

(73) Assignee: DATAGUISE INC., Fremont, CA (US)

( * ) Notice: Subject to any disclaimer, the term of this patent is extended or adjusted under 35 U.S.C. 154(b) by 398 days.

(21) Appl. No.: 13/842,798

(22) Filed: Mar. 15, 2013

(51) Int. Cl.
*G06F 17/30* (2006.01)
*G06F 21/62* (2013.01)
*H04N 21/235* (2011.01)
*H04N 21/2389* (2011.01)
*H04N 21/2383* (2011.01)
*H04N 21/8358* (2011.01)

(52) U.S. Cl.
CPC ........ *G06F 21/6227* (2013.01); *H04N 21/235* (2013.01); *H04N 21/2383* (2013.01); *H04N 21/2389* (2013.01); *H04N 21/8358* (2013.01)

(58) Field of Classification Search
CPC .................. G06F 17/30575; G06F 17/30091; G06F 17/243; G06F 11/3466; H04N 21/235; H04N 21/2383; H04N 21/2389; H04N 21/8358
USPC ........ 707/600, 602, 634, 757, 637; 709/206, 709/224, 209; 382/100; 715/716; 713/176
See application file for complete search history.

(56) References Cited

U.S. PATENT DOCUMENTS

| | | | | |
|---|---|---|---|---|
| 6,037,984 A * | 3/2000 | Isnardi et al. | ........... | 375/240.21 |
| 6,061,793 A * | 5/2000 | Tewfik et al. | .................. | 713/176 |
| 6,226,387 B1 * | 5/2001 | Tewfik | .................. | G06T 1/0028 |
| | | | | 375/E7.04 |
| 6,282,299 B1 * | 8/2001 | Tewfik | .................. | G06T 1/0028 |
| | | | | 375/E7.089 |
| 6,415,041 B1 * | 7/2002 | Oami | .................... | G06T 1/0028 |
| | | | | 382/100 |
| 6,792,129 B1 * | 9/2004 | Zeng | ..................... | G06T 1/0028 |
| | | | | 382/100 |
| 7,523,201 B2 * | 4/2009 | Lee et al. | ....................... | 709/225 |
| 7,526,733 B1 * | 4/2009 | Samson | .................. | G06F 21/16 |
| | | | | 715/764 |
| 7,742,619 B2 * | 6/2010 | Kumar | ............... | H04N 1/32154 |
| | | | | 358/3.28 |
| 7,818,577 B2 * | 10/2010 | David et al. | ................... | 713/176 |
| 7,836,508 B2 * | 11/2010 | Gumpel et al. | .................. | 726/26 |
| 8,019,116 B2 * | 9/2011 | Tian | .................... | H04N 1/32144 |
| | | | | 380/252 |
| 8,296,336 B2 * | 10/2012 | Menon | .............. | G06F 17/30489 |
| | | | | 707/809 |
| 8,355,525 B2 * | 1/2013 | McKinley et al. | ........... | 382/100 |
| 8,553,881 B2 * | 10/2013 | Lee et al. | ....................... | 380/205 |
| 8,726,029 B2 * | 5/2014 | Katzenbeisser | ......... | G06F 21/10 |
| | | | | 713/176 |
| 8,891,814 B2 * | 11/2014 | Vlachos et al. | .............. | 382/100 |
| 9,082,172 B2 * | 7/2015 | Doerr | .................... | G06T 1/0021 |

(Continued)

OTHER PUBLICATIONS

Wu et al. Towards the Diversity of Sensitive Attributes in k-Anonymity, 2006, IEEE, 4 pages.*

(Continued)

*Primary Examiner* — Frantz Coby
(74) *Attorney, Agent, or Firm* — Timberline Patent Law Group PLLC

(57) ABSTRACT

Methods and systems for tracking masking of one or more data elements in a datastore are disclosed. The methods involve monitoring one or more masking operations on the one or more data elements in the datastore. Thereafter, one or more metadata associated with the one or more masking operations are identified. Subsequent to identifying the one or more metadata, at least a part of the one or more metadata may be recorded. This metadata may then be transmitted to the destination when a copy (full/partial) of the original data is made, enabling the same information on masking to be obtained at the destination, as at the source.

11 Claims, 8 Drawing Sheets

(56) References Cited

U.S. PATENT DOCUMENTS

| | | | |
|---|---|---|---|
| 2003/0023713 A1* | 1/2003 | Slater et al. .................. 709/223 |
| 2004/0006696 A1* | 1/2004 | Shin et al. .................... 713/176 |
| 2005/0152458 A1* | 7/2005 | Tanaka ..................... 375/240.27 |
| 2006/0123237 A1* | 6/2006 | Burns ..................... G06F 21/16 |
| | | | 713/176 |
| 2008/0082834 A1* | 4/2008 | Mattsson ............ G06F 21/6209 |
| | | | 713/189 |
| 2008/0240435 A1* | 10/2008 | Celik ................... G06T 1/0028 |
| | | | 380/255 |
| 2009/0136026 A1* | 5/2009 | Celik ..................... G06T 1/005 |
| | | | 380/42 |
| 2010/0011074 A1* | 1/2010 | Billingsley ............ G06Q 30/06 |
| | | | 709/206 |
| 2010/0205189 A1* | 8/2010 | Ebrahimi ............ G06F 21/6227 |
| | | | 707/757 |
| 2011/0082927 A1* | 4/2011 | Chambers et al. ........... 709/224 |
| 2013/0148843 A1* | 6/2013 | Doerr et al. ................. 382/100 |
| 2013/0151855 A1* | 6/2013 | Petrovic ............. H04N 21/8358 |
| | | | 713/176 |
| 2013/0152210 A1* | 6/2013 | Petrovic .................. G06F 21/10 |
| | | | 726/26 |
| 2014/0129935 A1* | 5/2014 | Ovadia Nahon et al. .... 715/716 |
| 2014/0321695 A1* | 10/2014 | Srinivasan .................... 382/100 |

OTHER PUBLICATIONS

Rashid et al. Protect Privacy of Medical Informatics using K-Anonymization Model, Arab Academy of Science, 2006 HIPAA, 10 pages.*

Gardner et al. An Integrated Framework for De-Identifying Unstructured Medical Data, 2009 Elsevier B.V., 11pages.*

Erdal, De-Identified Multidimensional Medical Records for Disease Population Demographics and Image Processing Tools Development, 2011, Ohio State University, pp. 1-113.*

Erdal et al. A Database De-identification Framework to Enable Direct Queries on Medical Data for Secondary Use, Schattauer, Mar. 2012, pp. 229-241.*

\* cited by examiner

METHOD AND SYSTEM FOR TRACKING MASKING OF DATA

FIELD OF INVENTION

The invention generally relates to datastores. More specifically, the invention relates to methods and systems for tracking masking operations in datastores. Masking is an operation performed on data elements in datastores, whereby one or more values of the data elements are transformed to one or more values which are seemingly genuine. The transformation is such that it is not possible to retrieve the original data elements from the transformed values.

BACKGROUND OF THE INVENTION

Enterprises, for example, banks and hospitals, have large datastores of sensitive information. Sensitive information may include bank account numbers, credit card numbers, social security numbers etc. The sensitive information is valuable and is under constant threat. To prevent any unwanted exposure of the sensitive data, enterprises may employ various masking techniques to obscure the sensitive information. The masking operations applied on the one or more data elements transforms the one or more data elements in a manner that make them look real but conceal sensitive information represented by the one or more data elements. In some cases, only a part of the information in a datastore table may be masked. Currently, there is no method to track the masked data in a datastore in case a copy (partial/full) of the datastore is made. As a result, the history of the masking operation will be lost in the copies.

There is therefore, a need for a method and system for tracking masking of one or more data elements in a datastore.

BRIEF DESCRIPTION OF THE FIGURES

The accompanying figures, reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
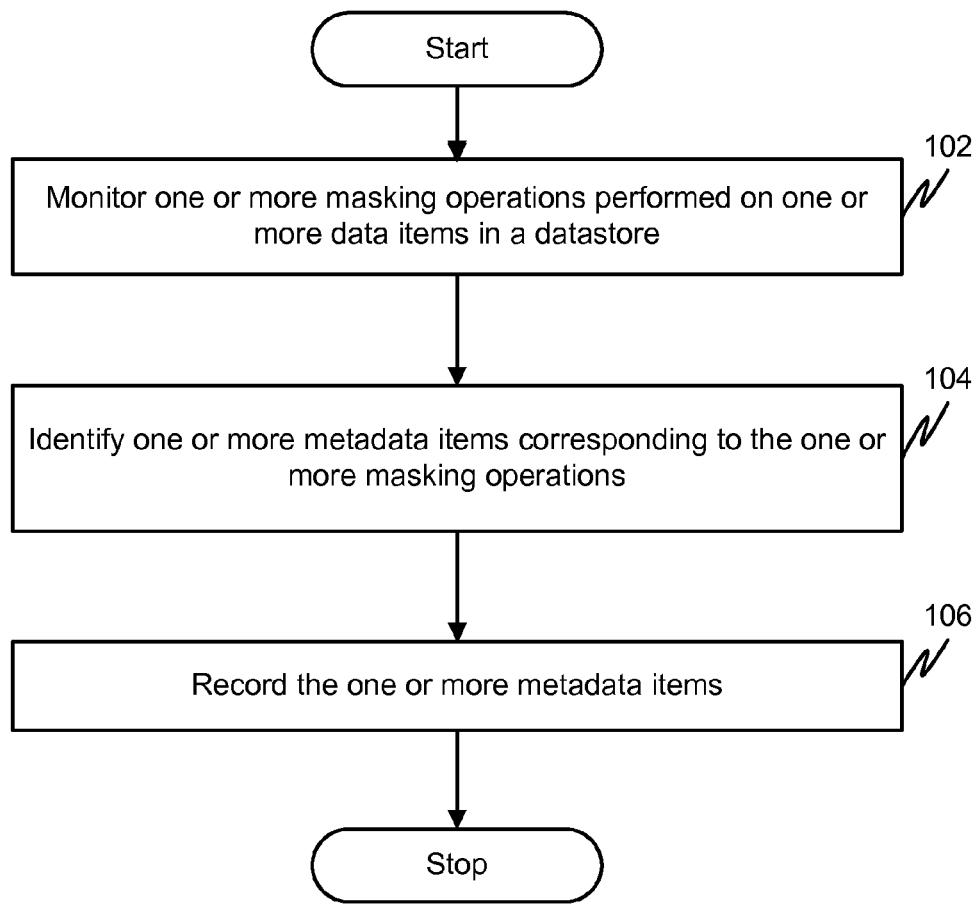
FIG. 1 illustrates a flow diagram of a method of tracking masking of one or more data elements in a datastore in accordance with an embodiment.

As required, embodiments of the method and system are disclosed herein; however, it is to be understood that the disclosed embodiments are merely exemplary of the methods and systems, which can be embodied in various forms. Therefore, specific functional details disclosed herein are not to be interpreted as limiting, but merely as a representative basis for teaching one skilled in the art to variously employ the methods and systems in virtually any appropriately detailed structure. Further, the terms and phrases used herein are not intended to be limiting but rather to provide an understandable description of the methods and systems.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Various embodiments of methods and systems disclosed herein provide tracking masking of one or more data elements in a datastore. The one or more data elements may include, but are not limited to, credit card numbers, mail IDs, bank account numbers, social security numbers and health records. The methods involve monitoring one or more masking operations on the one or more data elements in the datastore. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. Also, unlike encryption, a masking operation cannot be reversed. Subsequently, one or more metadata associated with the one or more masking operations are identified. The one or more metadata associated with a masking operation of the one or more data items may include, but are not limited to, masking status of at least a part of the one or more data elements, time of performing the masking operation, type of masking algorithm corresponding to the masking operation, a degree of the masking operation, an identifier associated with the one or more data elements, name of an application performing the masking operation and a context of the masking operation. The identifier associated with the one or more data elements may include, but is not limited to, a datastore type identifier, a table identifier, a partition identifier, a view identifier, a row identifier and a column identifier. Subsequent to identifying the one or more metadata, at least a part of the one or more metadata may be recorded. In some embodiments, the at least a part of the one or more metadata may be recorded at one or more of, but not limited to, inside the datastore and outside the datastore.

FIG. 1 illustrates a flow diagram of a method of tracking masking of one or more data elements in a datastore. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. At step 102, one or more masking operations on the one or more data elements in the datastore are monitored. In an embodiment, the monitoring may be performed by intercepting commands corresponding to the one or more masking operations from an application performing the one or more masking operations. In another embodiment, the monitoring may be performed by analyzing the one or more data elements in the datastore. In yet another embodiment, the monitoring may be performed by analyzing an input to the application performing the one or more masking operations. In an embodiment, the one or more metadata associated with the one or more masking operations performed on the one or more data elements may be tracked without the need for monitoring the one or more data elements that are being masked. For example, an application that performs masking of the one or more data elements may track the one or more metadata associated with the one or more masking operations. The input may be originated from one or more of a user and another application. In still yet another embodiment, the monitoring may be performed by analyzing one or more logs corresponding to one or more of, but not limited to, the datastore, an application performing the one or more masking operations and an operating system supporting the datastore.

Thereafter, one or more metadata associated with the one or more masking operations are identified at step 104. The one or more metadata associated with a masking operation of the one or more masking operations may include, but is not limited to, masking status of at least a part of the one or more data elements, time of performing the masking operation, a type of masking algorithm corresponding to the masking operation, a degree of the masking operation, an identifier associated with the one or more data elements, a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a column identifier, a row identifier and a partition identifier. The context of the masking operation may include one or more of, but is not limited to, a transaction identifier associated with the masking operation, identity of an owner of the one or more data elements, identity of a user initiating the masking operation. The identification of the one or more metadata may be performed by analyzing a result of the monitoring.

Subsequent to identifying the one or more metadata, at least a part of the one or more metadata may be recorded at step 106. In some embodiments, at least a part of the one or more metadata may be recorded at one or more of, but not limited to, inside the datastore and outside the datastore. For instance, the one or more metadata may be recorded in a table inside the datastore. In another instance, the one or more metadata may be recorded in a central repository located outside the datastore being masked. In yet another embodiment, at least a part of the one or more metadata may be recorded at one or more security controllers. In an embodiment, the one or more security controllers are responsible for maintaining the one or more metadata. In another embodiment, the one or more security controllers may initiate and control one or more actions of searching and masking the one or more data elements. One or more security controllers may mediate in performing functions such as, but not limited to, controlling security operations of the one or more data and controlling information found about the sensitive data. Additionally, a tool such as, but not limited to, a command script, an Information Lifecycle Management (ILM) tool, an Extract Transform Load (ETL) tool and any other similar tool may use the one or more security controllers to perform functions such as copying the one or more metadata and storing the one or more metadata. Moreover, the one or more metadata may be recorded in one or more of a structured and an unstructured format. For example, the one or more metadata may be recorded in an XML format. In some embodiments, an Application Programming Interface (API) may be used for recording the one or more metadata. More generally, the API may be capable of performing one or more of reading, recording and updating the one or more metadata.

In an embodiment, the one or more metadata associated with the one or more masking operations may be recorded as a watermark table. The watermark table comprises of at least a portion of the one or more metadata. The watermark table may be stored at one or more of inside the datastore and outside the datastore. In another embodiment, the one or more metadata associated with the one or more masking operations may be recorded as a pointer table. The pointer table comprises one or more pointers to the one or more metadata. The pointer table may be stored at one or more of inside the datastore and outside the datastore. For example, the pointer table may be stored inside the datastore while the one or more metadata is stored in a central repository outside the datastore, with the pointers in the pointer table pointing to the one or more metadata stored in the central repository.

In an embodiment, the method includes copying the one or more metadata to a destination when the one or more data elements is copied to the destination. For example, the one or more data elements in the datastore may be copied to the destination. The destination may be one or more of, but are not limited to, inside the datastore and outside the datastore. Consequently, the one or more metadata may be propagated to the destination. For example, when a table containing masked data in columns C2 and C3 is copied from the datastore to another datastore, metadata indicating the masking status of data in columns C2 and C3 are also copied to the another datastore.

In an embodiment, the watermark table may be copied along with the datastore when the datastore is copied to a destination. The destination may be one or more of, a datastore, a server and any system that is capable of storing a datastore object such as, but not limited to, a table, a partition, a row, a column, a schema, a key and a tag. For example, a table of the datastore may be copied to the destination. Subsequently, a copy of the watermark table associated with the table is also copied to the destination.

In another embodiment, the method includes recording of the one or more metadata at a first security controller. One or more security controllers may perform functions such as, but not limited to, controlling security operations on the one or more datastores and reporting information found about the sensitive data. Additionally, a tool such as, but not limited to, a command script, an ILM tool, an ETL tool and any other similar tool may use the one or more security controllers to perform functions such as copying the one or more metadata and storing the one or more metadata. Subsequently, a copy of at least a part of the one or more metadata may be operated on by a second security controller. The second security controller also manages the security operations on the copy of at least a part of the one or more data elements at a destination The method further includes communicating the one or more metadata corresponding to the at least a subset of the one or more data elements between the first security controller and the second security controller.

Figure 2:
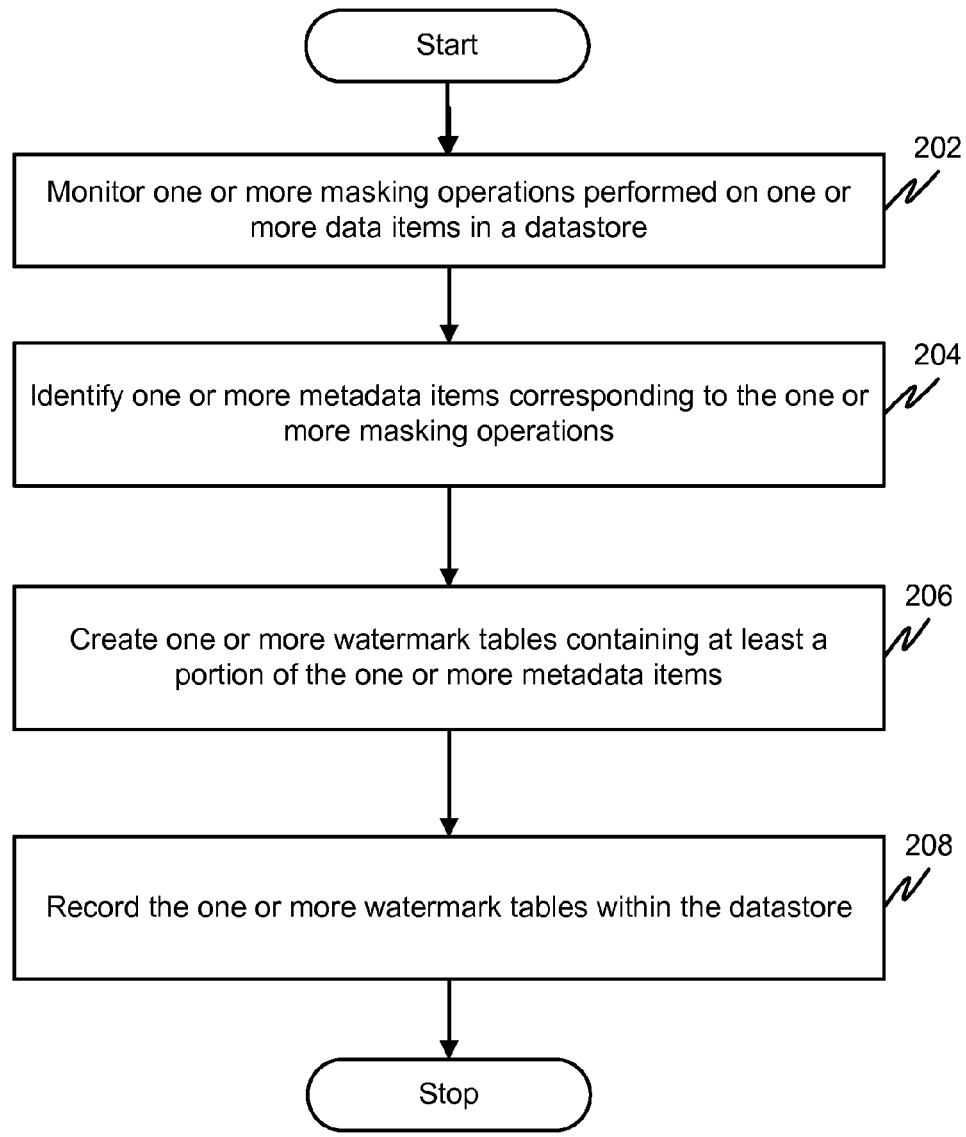
FIG. 2 illustrates a flow diagram of a method of tracking masking of one or more data elements in a datastore in accordance with an exemplary embodiment.

FIG. 2 shows a flow diagram of a method of tracking masking of one or more data elements in a datastore in accordance with an exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. In this embodiment, one or more metadata associated with one or more masking operations are recorded as watermark tables within the datastore. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. At step 202, one or more masking operations on the one or more data elements in the datastore are monitored. In an embodiment, the monitoring may be performed by intercepting commands corresponding to the one or more masking operations from an application performing the one or more masking operations. In another embodiment, the monitoring may be performed by analyzing the one or more data elements in the datastore. In yet another embodiment, the monitoring may be performed by analyzing an input to the application performing the one or more masking operations. The input may be originated from one or more of a user and another application. In still yet another embodiment, the monitoring may be performed by analyzing one or more logs corresponding to one or more of, but not limited to, the datastore, an application performing the one or more masking operations and an operating system supporting the datastore.

Thereafter, one or more metadata associated with the one or more masking operations are identified at step 204. The one or more metadata associated with a masking operation of the one or more masking operations may include, but are not limited to, masking status of at least a part of the one or more data elements, time of performing the masking operation, type of masking algorithm corresponding to the masking operation, a degree of the masking operation, an identifier associated with the one or more data elements, a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but is not limited to, a transaction identifier associated with the masking operation, identity of an owner of the one or more data elements, identity of a user initiating the masking operation. The identification of the one or more metadata may be performed by, but not limited to, analyzing the one or more logs associated with the one or more masking operations. The identification of the one or more metadata may be performed by analyzing a result of the monitoring.

Subsequent to the identification of the one or more metadata, the one or more metadata may be recorded in one or more watermark tables in step 208. A watermark table of the one or more watermark tables may be a table with one or more values corresponding to the one or more metadata. The one or more watermark tables may be recorded within the datastore along with the one or more data elements. Whenever the datastore is copied to a destination, the watermark table is copied along with the datastore to the destination. The destination may be one or more of, a datastore, a server and any system that is capable of storing a datastore object such as, but not limited to, a table, a partition, a row, a column, a schema, a key and a tag.

In an exemplary embodiment, one or more source identifiers may be stored within the watermark table. The one or more source identifiers may be associated with an original source corresponding to the one or more data elements. The one or more source identifiers may include, but are not limited to, a datastore name, a datastore number, a department to which the datastore belongs, a location of the datastore, a datastore tag and an IP address of the machine on which the datastore is hosted. The original source of the one or more data elements may include one or more of, an application, a memory source and a network based source from where the one or more data elements originated. The one or more source identifiers of an application may include, but are not limited to, application name, application serial number and application signature. The one or more source identifiers of a memory source include, but are not limited to, a memory address, a memory path, a network address of the host on which the memory is located, a volume identifier and a partition identifier. The one or more source identifiers of a network based source may include, but are not limited to, an IP address, a session ID, a transaction ID and a network address. The one or more source identifiers may be copied along with the watermark table when the datastore is copied to the destination. In an embodiment, the one or more source identifiers may not be modified. In an exemplary scenario, the one or more source identifiers may be recorded in the watermark table. The part of the watermark table that has the one or more source identifiers may be immutable. The one or more source identifiers may be retained in original form when the datastore is copied to the destination. In another embodiment, the one or more source identifiers may be updated to change the original source.

In an exemplary scenario, the datastore may contain fields such as name, social security number (SSN), credit card number (CCN), age and gender as shown in table 2a. The one or more masking operations may be performed on table 2a in order to mask social security numbers and credit card numbers. The result of performing the one or more masking operations is depicted in table 2b. For this scenario, the one or more metadata associated with the one or more masking operations may be monitored and recorded in a watermark table as exemplarily shown in table 2c. Each field in the watermark table consists of the one or more metadata of the one or more masking operations performed on the corresponding field in table 2a. In the present example, the format of the one or more metadata is: (masking status, masking algorithm type identifier, date). For instance, the tuple (M, 8, 23-12-11) in the first row of the first column of the watermark table may indicate that the corresponding field in table 2a was masked (M) by a format preserving masking type of masking algorithm (indexed by digit 8) on 23 Dec. 2011. In another instance, the tuple (U, Null, Null) in the first row and fourth column indicates that the corresponding data in table 2a is unmasked (U). When the entire datastore is copied to a destination, the watermark table may also be copied along with the datastore, thus providing the metadata at the destination.

In another exemplary scenario, all rows of a column and all columns of a row in the datastore may be masked. The watermark tables may indicate one or more of rows and columns that were masked.

TABLE 2a

| Name | SSN | CCN | Age | Gender |
|------|-----|-----|-----|--------|
| John | 987-65-4320 | 9453-7655-9276-2987 | 32 | M |
| Jane | 987-65-4328 | 5263-0673-9394-7775 | 29 | F |

TABLE 2b

| Name | SSN | CCN | Age | Gender |
|------|-----|-----|-----|--------|
| John | 987-65-4325 | 3762-5480-3268-1830 | 32 | M |
| Jane | 987-65-4323 | 5173-5828-1523-9055 | 29 | F |

TABLE 2c

| (M, 8, 23-12-11) | (M, 8, 23-12-11) | (U, null, null) | (U, null, null) |
| (M, 8, 23-12-11) | (M, 8, 23-12-11) | (U, null, null) | (U, null, null) |

Figure 3:
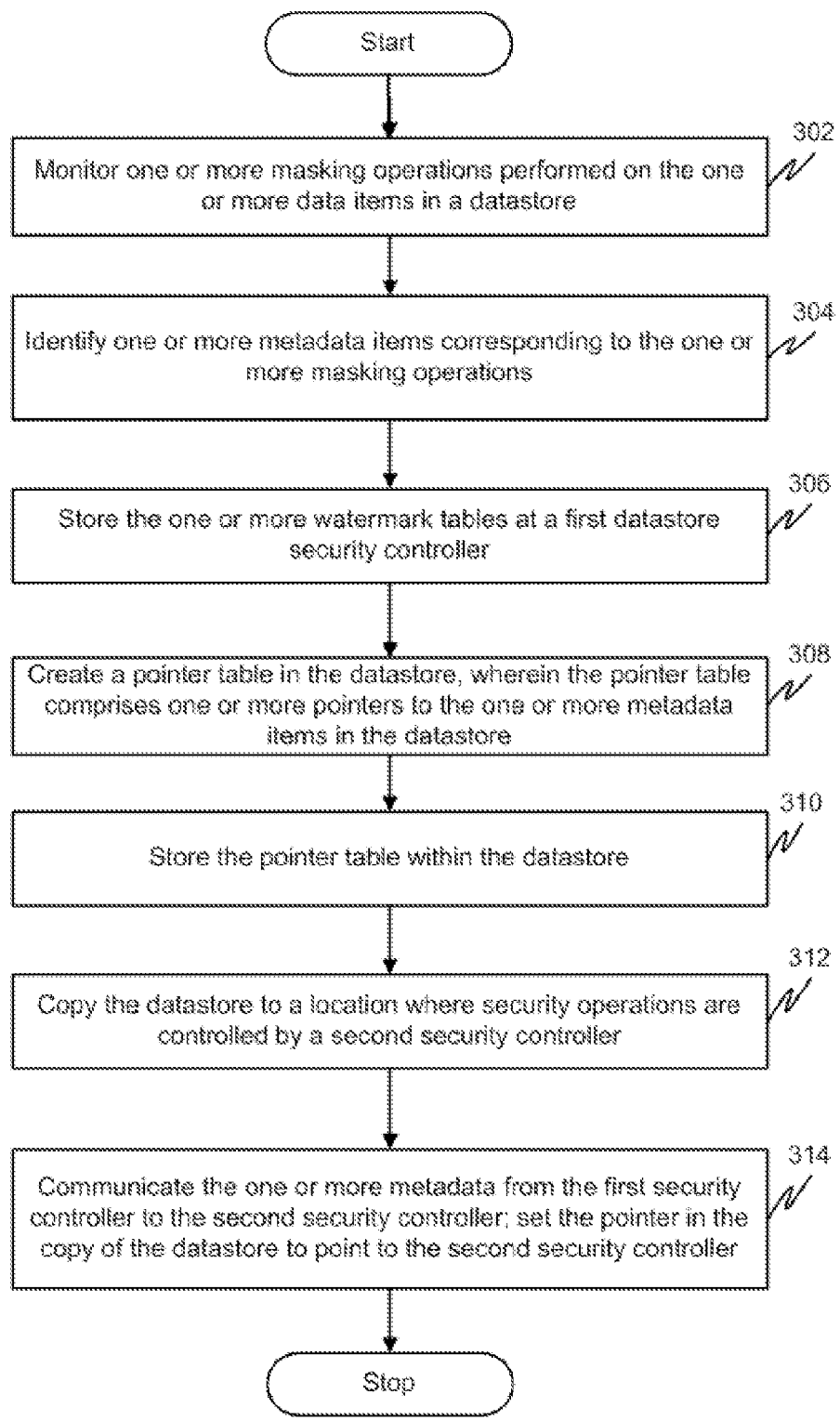
FIG. 3 illustrates a flow diagram of a method of tracking masking of one or more data elements in a datastore in accordance with another exemplary embodiment.

FIG. 3 illustrates a flow diagram of a method of tracking masking of one or more data elements in a datastore in accordance with another exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. In this embodiment, the method includes recording of one or more metadata at a first security controller associated with the datastore, creating one or more pointer tables in the datastore and communicating the one or more metadata and the one or more pointer tables to a second security controller. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. At step 302, one or more masking operations on the one or more data elements in the datastore are monitored.

In an embodiment, the monitoring may be performed by intercepting commands corresponding to the one or more masking operations from an application performing the one or more masking operations. In another embodiment, the monitoring may be performed by analyzing the one or more data elements in the datastore. In yet another embodiment, the monitoring may be performed by analyzing an input to the application performing the one or more masking operations. The input may be originated from one or more of a user and another application. In still yet another embodiment, the monitoring may be performed by analyzing one or more logs corresponding to one or more of, but not limited to, the datastore, an application performing the one or more masking operations and an operating system supporting the datastore.

Thereafter, one or more metadata associated with the one or more masking operations are identified at step 304. The one or more metadata associated with a masking operation of the one or more masking operations may include, but is not limited to, masking status of at least a part of the one or more data elements, time of performing the masking operation, type of masking algorithm corresponding to the masking operation, a degree of the masking operation, an identifier associated with the one or more data elements a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but is not limited to, a transaction identifier associated with the masking operation, identity of an owner of the one or more data elements, identity of a user initiating the masking operation. The identification of the one or more metadata may be performed by, but not limited to, analyzing the one or more logs associated with the one or more masking operations. The identification of the one or more metadata may be performed by analyzing a result of the monitoring.

Subsequent to the identification of the one or more metadata, the one or more metadata are recorded at a first security controller at step 306. One or more security controllers may perform functions such as, but not limited to, controlling security operations on the one or more data and reporting information found about the sensitive data. Additionally, a tool such as, but not limited to, a command script, an ILM tool, an ETL tool and any other similar tool may use the one or more security controllers to perform functions such as copying the one or more metadata and storing the one or more metadata. The first security controller may mediate functions such as, but not limited to, copying the one or more metadata and storing the one or more metadata. Thereafter, at step 308, a pointer table comprising one or more pointers to the one or more metadata may be created.

In an embodiment, the pointer table in the datastore may be pointing to the one or more metadata recorded in the first security controller. In one scenario, the copy of the data store is still under the control of the first controller. When the datastore is copied to one or more destinations by the first security controller, each of one or more datastores that are copied may contain the pointer table pointing to the one or more metadata in the first security controller.

In an exemplary scenario, the datastore may contain fields such as name, social security number (SSN), credit card number (CCN), age and gender as shown in table 3a. The one or more masking operations may be performed on table 3a in order to mask social security numbers and credit card numbers. The result of performing the one or more masking operations is depicted in table 3b. For this scenario, the one or more metadata associated with the one or more masking operations may be monitored and recorded in the first controller. A pointer table may be created in the datastore as exemplarily shown in table 3c. The pointer table consists of a pointer that includes addresses of the one or more metadata of the one or more masking operations performed on the corresponding field in table 3a. For instance, the tuple (db3, tb6, 1, 1) in the first row of the first column of the pointer table may be a pointer to the one or more metadata associated with data in the first row of the first column in table 3a. The pointer may be pointing to a location of the one or more metadata corresponding to data in the first row of the first column in table 3a. The location is specified by a datastore name (db3), a table name (tb6), row identifier (1) and column identifier (1). In another instance, the null value in the first row and fourth column indicates that the corresponding data in table 3a is unmasked (U). When the entire datastore is copied to the destination, the pointer table may also be copied along with the datastore, thus providing the metadata at the destination.

TABLE 3a

| Name | SSN | CCN | Age | Gender |
|---|---|---|---|---|
| John | 987-65-4320 | 9453-7655-9276-2987 | 32 | M |
| Jane | 987-65-4328 | 5263-0673-9394-7775 | 29 | F |

TABLE 3b

| Name | SSN | CCN | Age | Gender |
|---|---|---|---|---|
| John | 987-65-4325 | 3762-5480-3268-1830 | 32 | M |
| Jane | 987-65-4323 | 5173-5828-1523-9055 | 29 | F |

TABLE 3c

| (db3, tb6, 1, 1) | (db3, tb6, 1, 2) | Null | Null |
|---|---|---|---|
| (db3, tb6, 2, 1) | (db3, tb6, 2, 2) | Null | Null |

In another scenario, at step 310, a copy of the datastore may be installed at a destination, with security operations on this being controlled a second security controller. The destination may be one or more of, a datastore, a server and any system that is capable of storing a datastore object such as, but not limited to, a table, a partition, a row, a column, a schema, a key and a tag. At step 312, the pointer table may be copied along with the copy of the datastore. The second security controller may retrieve the one or more metadata by communicating with the first security controller through an out of band communication mechanism. The pointers in the copy of the datastore can now be modified to point to the second security controller, so all the metadata relevant to the copy of the datastore are now controlled by the second security controller. In an embodiment, the act of modification of the pointers consists of changing the IP address of the security controller stored within the pointer table, which is in the copy of the datastore. At step 314, the one or more metadata in the first security controller may be communicated to the second security controller. Thereafter, a pointer may be set in the copy of the datastore to point to the second security controller.

Figure 4:
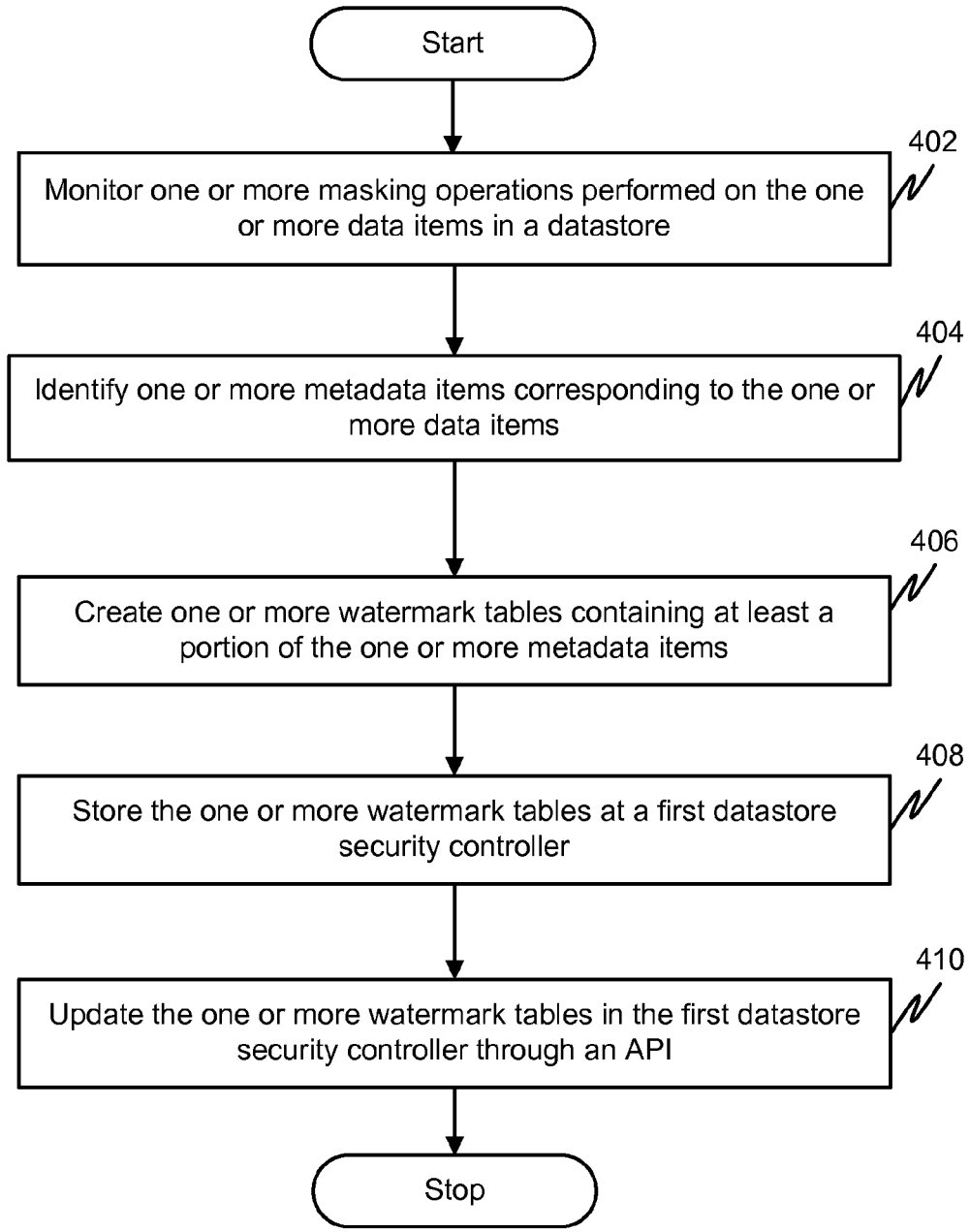
FIG. 4 illustrates a flow diagram of a method of tracking masking of one or more data elements in a datastore in accordance with yet another exemplary embodiment.

FIG. 4 illustrates a flow diagram of a method of tracking masking of one or more data elements in a datastore in accordance with yet another exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. At step 402, one or more masking operations on the one or more data elements in the datastore are monitored. In an embodiment, the monitoring may be performed by intercepting commands corresponding to the one or more masking operations from an application performing the one or more masking operations. In another embodiment, the monitoring may be performed by analyzing the one or more data elements in the datastore. In yet another embodiment, the monitoring may be performed by analyzing an input to the application performing the one or more masking operations. The input may be originated from one or more of a user and another application. In still yet another embodiment, the monitoring may be performed by analyzing one or more logs corresponding to one or more of, but not limited to, the datastore, an application performing the one or more masking operations and an operating system supporting the datastore.

Thereafter, one or more metadata associated with the one or more masking operations are identified at step 404. The one or more metadata associated with a masking operation of the one or more masking operations may include, but is not limited to, masking status of at least a part of the one or more data elements, time of performing the masking operation, type of masking algorithm corresponding to the masking operation, a degree of the masking operation, an identifier associated with the one or more data elements, a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but is not limited to, a transaction identifier associated with the masking operation, identity of an owner of the one or more data elements, identity of a user initiating the masking operation. The identification of the one or more metadata may be performed by, but not limited to, analyzing the one or more logs associated with the one or more masking operations. The identification of the one or more metadata may be performed by analyzing a result of the monitoring.

Subsequent to the identification of the one or more metadata, at step 406, a watermark table may be created. The watermark table may comprise the one or more metadata. Additionally, the watermark table may comprise location information corresponding to the one or more data elements. For example, the location information may include one or more of, but not limited to, a datastore name, an IP address, a socket number, a table identifier, a column identifier and a row identifier. Thereafter, the watermark table may be recorded at a first security controller at step 408. The first security controller may perform functions such as, but not limited to, controlling security operations of the one or more data. Further, the first security controller may be configured to mediate functions like copying the one or more metadata and storing the one or more metadata. In some embodiments, tools such as, but not limited to, a processing script, Information Lifecycle Management (ILM) tool, and an Extract Transform Load (ETL) tool may use the first security controller to perform one or more of retrieve, store and update the watermark table. In an exemplary scenario, one or more masking operations may be performed on the one or more data elements in the datastore by one or more of, but not limited to, a user and an application. Thereafter, at step 410, the one or more masking operations performed on the one or more data elements is communicated to the first security controller through an Application Programming Interface (API). The API may be of the form updateWatermark (DBlocation, DBname, DBIdentifier1, DBIdentifier2, . . . . , Maskinfo1, Maskinfo2 . . . ). The field DBlocation may indicate the location of the datastore containing the one or more data elements subjected to masking. The field DBname may indicate the name given to the datastore containing the one or more data elements subjected to masking. Further the API may include a number of DBIdentifiers that provide information regarding the exact location of the one or more data elements subjected to masking Finally, the API may include one or more Maskinfo fields that represent the properties of the one or more masking operations.

Figure 5:
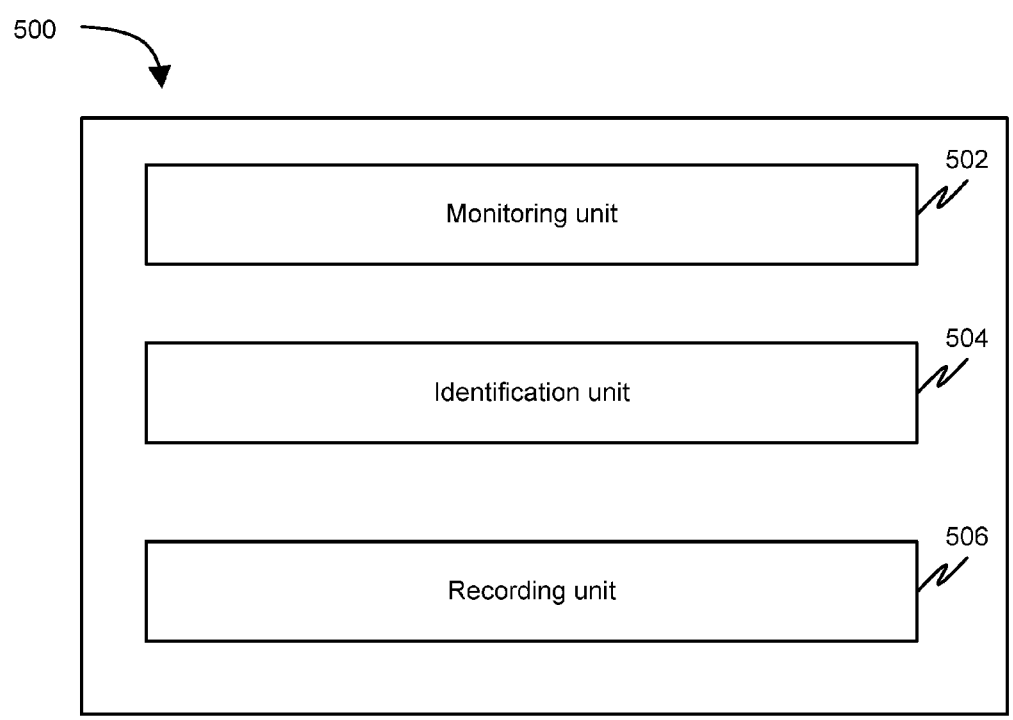
FIG. 5 illustrates a system for tracking masking of one or more data elements in a datastore in accordance with an exemplary embodiment.

FIG. 5 indicates a system 500 that may be configured to track masking of one or more data elements in a datastore. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. A monitoring unit 502 may be configured to monitor the one or more masking operations on the one or more data elements in the datastore. In an embodiment, monitoring unit 502 may perform monitoring by intercepting commands corresponding to the one or more masking operations from an application performing the one or more masking operations. In another embodiment, monitoring unit 502 may perform monitoring by analyzing the one or more data elements in the datastore. In yet another embodiment, monitoring unit 502 may perform monitoring by analyzing an input to the application performing the one or more masking operations. The input may be originated from one or more of a user and another application. In still yet another embodiment, monitoring unit 502 may perform monitoring by analyzing one or more logs corresponding to one or more of, but not limited to, the datastore, an application performing the one or more masking operations and an operating system supporting the datastore. In an embodiment, the one or more metadata associated with the one or more masking operations performed on the one or more data elements may be tracked without the need for monitoring unit 502 for monitoring the one or more data elements that are being masked. For example, an application that performs masking of the one or more data elements also tracks the one or more metadata associated with the one or more masking operations.

Thereafter, an identification unit 504 may be configured to monitor the one or more metadata associated with the one or more masking operations. The one or more metadata associated with a masking operation of the one or more masking operations may include, but is not limited to, masking status of at least a part of the one or more data elements, time of performing the masking operation, a type of masking algorithm corresponding to the masking operation, a degree of the masking operation, an identifier associated with the one or more data elements a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but is not limited to, a transaction identifier associated with the masking operation, identity of an owner of the one or more data elements, identity of a user initiating the masking operation. Identification unit 504 may perform identification of the one or more metadata by analyzing a result of the monitoring.

System 500 further comprises a recording unit 506 configured to record at least a part of the one or more metadata. In some embodiments, recording unit 506 may be configured to record the at least a part of the one or more metadata at one or more of, but not limited to, inside the datastore and outside the datastore. For instance, the one or more metadata may be recorded in a table inside the datastore. In another instance, recording unit 506 may be configured to record the one or more metadata in a central repository located outside the datastore. In yet another embodiment, recording unit 506 may be configured to record at least a part of the one or more metadata at one or more security controllers. One or more security controllers may perform functions such as, but not limited to, controlling security operations of the one or more data and controlling information found about the sensitive data. Additionally, a tool such as, but not limited to, a command script, an ILM tool, an ETL tool and any other similar tool may use the one or more security controllers to perform functions such as copying the one or more metadata elements and storing the one or more metadata. Moreover, recording unit 506 may record the one or more metadata in one or more of a structured and an unstructured format. For example, the one or more metadata may be recorded by recording unit 506 in an XML format. In some embodiments, an Application Programming Interface (API) may be used for recording the one or more metadata. More generally, the API may be capable of performing one or more of reading, recording and updating the one or more metadata.

In an embodiment, recording unit 506 may record the one or more metadata associated with the one or more masking operations as a watermark table. The watermark table comprises at least a portion of the one or more metadata. The watermark table may be stored at one or more of inside the datastore and outside the datastore. In another embodiment, recording unit 506 may record the one or more metadata associated with the one or more masking operations as a pointer table. The pointer table comprises one or more pointers to the one or more metadata. The pointer table may be stored at one or more of inside the datastore and outside the datastore. For example, the pointer table may be stored inside the datastore while the one or more metadata is stored in a central repository outside the datastore.

In an embodiment, system 500 may further comprise a copy generation unit configured to copy one or more of the one or more data elements and the one or more metadata to a destination. For example, the copy generation unit may be configured to copy the one or more data elements in the datastore to the destination. In an embodiment, the copy generation unit may include, but is not limited to, a script, an ILM tool, an ETL tool, and any other similar tools. The destination may be located, one or more of, but is not limited to, inside the datastore and outside the datastore. The destination may be one or more of, a datastore, a server and any system that is capable of storing a datastore object such as, but not limited to, a table, a partition, a row, a column, a schema, a key and a tag. Consequently, the one or more metadata may be transferred to the destination along with the one or more data elements in the datastore. For example, when a table containing masked data in columns C2 and C3 is copied from the datastore to another datastore, metadata indicating the masking status of data in columns C2 and C3 are also copied to the another datastore.

In another embodiment, system 500 may comprise one or more security controllers such as for example, a first security controller and a second security controller. In an embodiment, the one or more security controllers are responsible for maintaining the one or more metadata. In another embodiment, the one or more security controllers may initiate and control one or more of searching and masking the one or more data elements. The one or more security controllers may mediate in performing functions such as, but not limited to, controlling security operations of the one or more data and controlling information found about the sensitive data. Additionally, a tool such as, but not limited to, a command script, an ILM tool, an ETL tool and any other similar tool may use the one or more security controllers to perform functions such as copying the one or more metadata and storing the one or more metadata. Further, in some embodiments, recording unit 506 may be configured to record the one or more metadata at the first security controller. In some other embodiments, system 500 may comprise a copy generation unit configured to generate a copy of at least a part of the one or more data elements. The second security controller manages the security operations during the process of copying at least a part of the one or more data elements. System 500 may further comprise a communication unit configured to communicate the one or more metadata corresponding to the at least a part of the one or more data elements between the first security controller and the second security controller. One or more of the first security controller and the second security controller may perform functions such as, but not limited to, copying the one or more metadata and storing the one or more metadata. The functions may be performed through the API.

Figure 6:
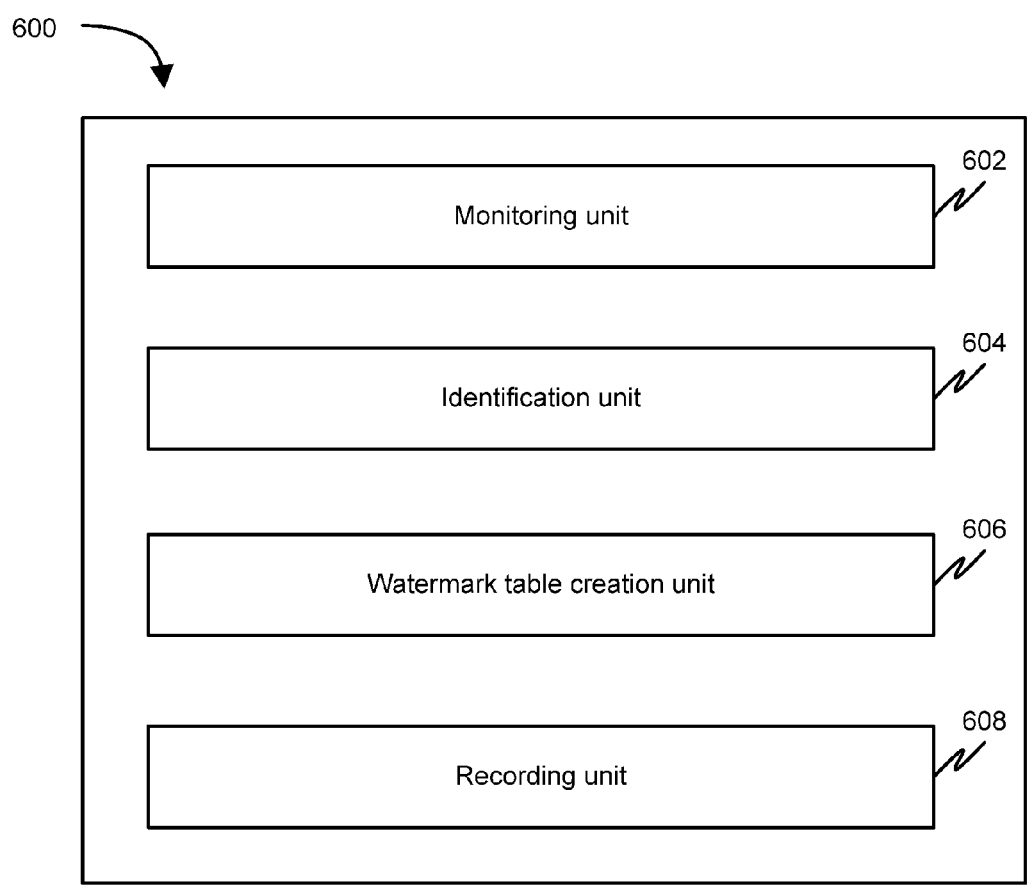
FIG. 6 illustrates a system for tracking masking of one or more data elements in a datastore in accordance with an exemplary embodiment.

FIG. 6 shows a system 600 configured to track masking of one or more data elements in a datastore in accordance with an exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. System 600 comprises a monitoring unit 602 configured to monitor the one or more masking operations on the one or more data elements in the datastore. In an embodiment, monitoring unit 502 may be configured to perform monitoring by intercepting commands corresponding to the one or more masking operations from an application performing the one or more masking operations. In another embodiment, monitoring unit 502 may be configured to perform monitoring by analyzing the one or more data elements in the datastore. In yet another embodiment, monitoring unit 602 may be configured to perform monitoring by analyzing an input to the application performing the one or more masking operations. The input may be originated from one or more of a user and another application. In still yet another embodiment, monitoring unit 602 may be configured to perform monitoring by analyzing one or more logs corresponding to one or more of, but not limited to, the datastore, an application performing the one or more masking operations and an operating system supporting the datastore.

Further, system 600 comprises an identification unit 604 configured to monitor the one or more metadata associated with the one or more masking operations. The one or more metadata associated with a masking operation of the one or more masking operations may include, but is not limited to, masking status of at least a part of the one or more data elements, time of performing the masking operation, a type of masking algorithm corresponding to the masking operation, a degree of the masking operation, an identifier associated with the one or more data elements a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but is not limited to, a transaction identifier associated with the masking operation, identity of an owner of the one or more data elements, identity of a user initiating the masking operation. Identification unit 604 may be configured to perform identification of the one or more metadata by analyzing a result of the monitoring.

Further, system 600 also comprises a watermark table creation unit 606 configured to generate one or more watermark tables that contains information associated with the one or more masking operations. A watermark table of the one or more watermark tables may be a table with one or more values corresponding to the one or more metadata. The one or more watermark tables may be recorded within the datastore along with the one or more data elements. A copy generation unit may copy the datastore to a destination. The watermark table may be inherently copied along with the datastore to the destination. The destination may be one or more of, a datastore, a server and any system that is capable of storing a datastore object such as, but not limited to, a table, a partition, a row, a column, a schema, a key and a tag.

In an exemplary embodiment, one or more source identifiers may be stored within the watermark table. The one or more source identifiers may be associated with an original source corresponding to the one or more data elements. The one or more source identifiers may include, but are not limited to, a datastore name, a datastore number, a department to which the datastore belongs, a location of the datastore, a datastore tag and an IP address of the machine on which the datastore is hosted. The original source of the one or more data elements may include one or more of, an application, a memory source and a network based source from where the one or more data elements originated. The one or more source identifiers of an application may include, but are not limited to, application name, application serial number and application signature. The one or more source identifiers of a memory source include, but are not limited to, a memory address, a memory path, a network address of the host on which the memory is located, a volume identifier and a partition identifier. The one or more source identifiers of a network based source may include, but are not limited to, an IP address, a session ID, a transaction ID and a network address. The one or more source identifiers may be copied along with the watermark table when the datastore is copied to the destination. In an embodiment, the one or more source identifiers may not be modified. In an exemplary scenario, the one or more source identifiers may be recorded in the watermark table. The part of the watermark table that has the one or more source identifiers may be immutable. The one or more source identifiers may be retained in original form when the datastore is copied to the destination. In another embodiment, the one or more source identifiers may be updated to change the original source.

In an exemplary scenario, the datastore may contain fields such as name, social security number (SSN), credit card number (CCN), age and gender as shown in table 6a. The one or more masking operations may be performed on table 6a in order to mask social security numbers and credit card numbers. The result of performing the one or more masking operations is depicted in table 6b. For this scenario, the one or more metadata associated with the one or more masking operations may be monitored by monitoring unit 602 and identified by identification unit 604. Thereafter, a watermark table having information associated with the one or more masking operations is generated by watermark table creation unit 606. Subsequently, the watermark table may be recorded in the datastore by recording unit 608 as exemplarily shown in table 6c. Each field in the watermark table consists of the one or more metadata of the one or more masking operations performed on the corresponding field in table 6a. In the present example, the format of the one or more metadata is: (masking_status, masking_algorithm type_identifier, date). For instance, the tuple (M, 8, 23-12-11) in the first row of the first column of the watermark table may indicate that the corresponding field in table 6a was masked (M) by a format preserving masking type of masking algorithm (indexed by digit 8) on 23 Dec. 2011. In another instance, the tuple (U, Null, Null) in the first row and fourth column indicates that the corresponding data in table 2a is unmasked (U). The copy generation unit may copy the datastore to the destination. Consequently, the watermark table is also copied along with the datastore, thus providing the metadata at the destination.

TABLE 6a

| Name | SSN | CCN | Age | Gender |
|------|-----|-----|-----|--------|
| John | 987-65-4320 | 9453-7655-9276-2987 | 32 | M |
| Jane | 987-65-4328 | 5263-0673-9394-7775 | 29 | F |

TABLE 6b

| Name | SSN | CCN | Age | Gender |
| --- | --- | --- | --- | --- |
| John | 987-65-4325 | 3762-5480-3268-1830 | 32 | M |
| Jane | 987-65-4323 | 5173-5828-1523-9055 | 29 | F |

TABLE 6c

| (M, 8, 23-12-11) | (M, 8, 23-12-11) | (U, null, null) | (U, null, null) |
| --- | --- | --- | --- |
| (M, 8, 23-12-11) | (M, 8, 23-12-11) | (U, null, null) | (U, null, null) |

Figure 7:
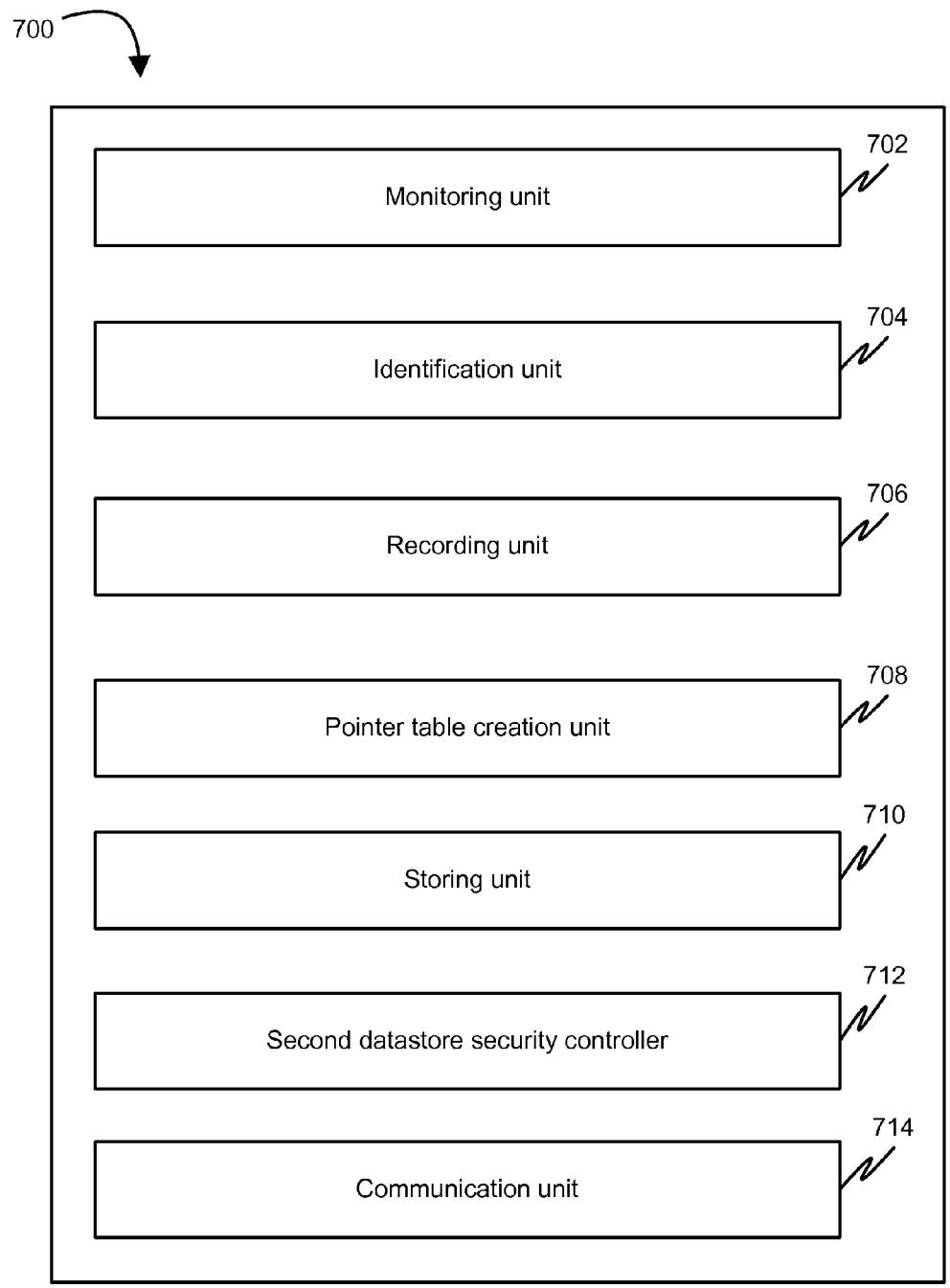
FIG. 7 illustrates a system for tracking masking of one or more data elements in a datastore in accordance with another exemplary embodiment.

FIG. 7 illustrates a system 700 configured to track masking of one or more data elements in a datastore in accordance with another exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. A monitoring unit 702 may be configured to monitor the one or more masking operations on the one or more data elements in the datastore. In an embodiment, monitoring unit 702 may be configured to perform monitoring by intercepting commands corresponding to the one or more masking operations from an application performing the one or more masking operations. In another embodiment, monitoring unit 702 may be configured to perform monitoring by analyzing the one or more data elements in the datastore. In yet another embodiment, monitoring unit 702 may be configured to perform monitoring by analyzing an input to the application performing the one or more masking operations. The input may be originated from one or more of a user and another application. In still yet another embodiment, monitoring unit 702 may be configured to perform monitoring by analyzing one or more logs corresponding to one or more of, but not limited to, the datastore, an application performing the one or more masking operations and an operating system supporting the datastore.

System 700 further comprises an identification unit 704 configured to monitor the one or more metadata associated with the one or more masking operations. The one or more metadata associated with a masking operation of the one or more masking operations may include, but is not limited to, masking status of at least a part of the one or more data elements, time of performing the masking operation, a type of masking algorithm corresponding to the masking operation, a degree of the masking operation, an identifier associated with the one or more data elements a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but not limited to, a transaction identifier associated with the masking operation, identity of an owner of the one or more data elements, identity of a user initiating the masking operation. Identification unit 704 may be configured to perform identification of the one or more metadata by analyzing a result of the monitoring.

System 700 further comprises a recording unit 706 and one or more security controllers such as for example, a first security controller and a second security controller. One or more security controllers may perform functions such as, but not limited to, controlling security operations of the one or more data and controlling information found about the sensitive data. Additionally, tools such as, but not limited to, a command script, an ILM tool, an ETL tool and any other similar tool may use the one or more security controllers to perform functions such as copying the one or more metadata elements and storing the one or more metadata. Recording unit 706 may be configured to record the one or more metadata at the first security controller. The first security controller may mediate functions such as, but not limited to, copying the one or more metadata and storing the one or more metadata. Further, system 700 comprises a pointer table creation unit 708 configured to create a pointer table comprising one or more pointers to the one or more metadata in the datastore. A storing unit 710 may be configured to store the pointer table within the datastore. System 700 comprises second security controller 712 configured mediate in the generation of a copy of the datastore at a destination. The destination may be one or more of, a datastore, a server and any system that is capable of storing a datastore object such as, but not limited to, a table, a partition, a row, a column, a schema, a key and a tag. The pointer table may be copied to the destination along with the copy of the datastore. A communication unit 714 may be configured to communicate the one or more metadata from the first security controller to the second security controller. The second security controller may be configured to retrieve the one or more metadata based on the pointer table by communicating with the first security controller through an out of band communication mechanism.

In an exemplary scenario, the datastore may contain fields such as name, social security number (SSN), credit card number (CCN), age and gender as shown in table 7a. The one or more masking operations may be performed on table 7a in order to mask social security numbers and credit card numbers. The result of performing the one or more masking operations is depicted in table 7b. For this scenario, monitoring unit 702 may be configured to monitor the one or more metadata associated the one or more masking operations. Subsequently, identification unit 704 identifies the one or more metadata and recording unit 706 may record the one or more metadata in the first controller. Pointer table creation unit 708 may be configured to create a pointer table as exemplarily shown in table 7c. Storing unit 710 may store the pointer table in the datastore. The pointer table consists of a pointer that includes addresses of the one or more metadata of the one or more masking operations performed on the corresponding field in table 7a. For instance, the tuple (db3, tb6, 1, 2) may be a pointer in the first row of the first column of the pointer table may be a pointer to the one or more metadata associated with the corresponding field in table 7a stored in the first controller. The pointer may be pointing to a location of the one or more metadata corresponding to data in the first row of the first column in table 3a. The location is specified by a datastore name (db3), a table name (tb6), row identifier (1) and column identifier (1). In another instance, the tuple Null in the first row and fourth column indicates that the corresponding data in table 7a is unmasked (U). The datastore may be copied to the destination through a second security controller 712. Consequently, the pointer table is also copied along with the datastore, thus providing the metadata at the destination. Further, communication unit 714 may communicate the one or more metadata recorded at the first security controller to second security controller 712. The second security controller 712 may refer to the pointer table that was copied and retrieve the corresponding metadata transferred from the first security controller through communication unit 714.

TABLE 7a

| Name | SSN | CCN | Age | Gender |
|---|---|---|---|---|
| John | 987-65-4320 | 9453-7655-9276-2987 | 32 | M |
| Jane | 987-65-4328 | 5263-0673-9394-7775 | 29 | F |

TABLE 7b

| Name | SSN | CCN | Age | Gender |
|---|---|---|---|---|
| John | 987-65-4325 | 3762-5480-3268-1830 | 32 | M |
| Jane | 987-65-4323 | 5173-5828-1523-9055 | 29 | F |

TABLE 7c

| (db3, tb6, 1, 1) | (db3, tb6, 1, 2) | Null | Null |
|---|---|---|---|
| (db3, tb6, 2, 1) | (db3, tb6, 2, 2) | Null | Null |

Figure 8:
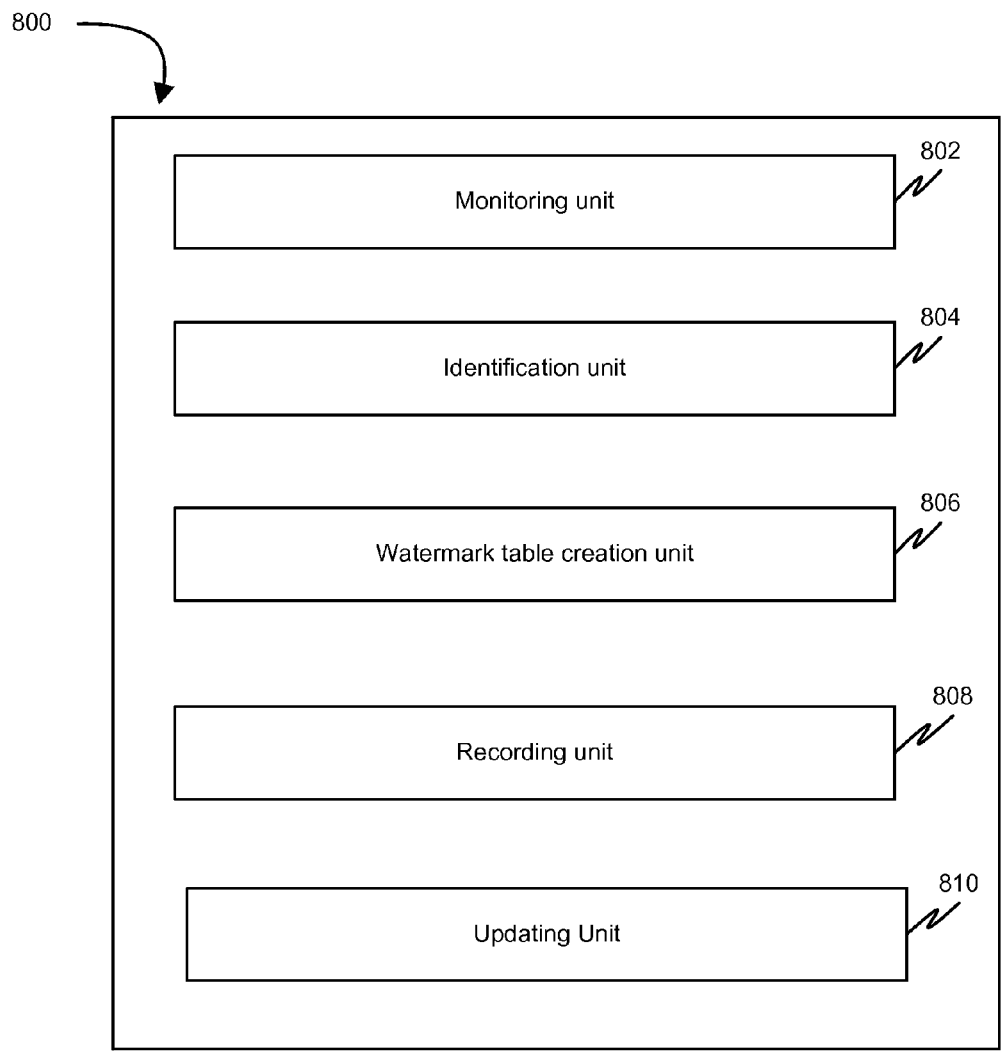
FIG. 8 illustrates a system for tracking masking of one or more data elements in a datastore in accordance with yet another exemplary embodiment.

FIG. 8 illustrates a system 800 configured to track masking of one or more data elements in a datastore in accordance with yet another exemplary embodiment. A masking operation of the one or more masking operations applied on the one or more data elements transforms the one or more data elements in a manner that conceals sensitive information represented by the one or more data elements. For example, the masking operation may result in one or more data elements becoming de-identified. De-identifying the one or more data elements provides protection against attempts to recognize an identity of an entity, such as but not limited to, an individual and an organization, associated with the one or more data elements. The datastore may be for example, but is not limited to, an Oracle database, a DB2 database, a Microsoft Access database, a Microsoft SQL Server database, a PostgreSQL database, a MySQL database, a FileMaker database, and a Sybase Adaptive Server Enterprise database. The one or more data elements may include, but are not limited to, credit card numbers, mail IDs, bank account numbers, social security numbers and health records. System 800 comprises a monitoring unit 802 configured to monitor the one or more masking operations on the one or more data elements in the datastore. In an embodiment, monitoring unit 802 may be configured to perform monitoring by intercepting commands corresponding to the one or more masking operations from an application performing the one or more masking operations. In another embodiment, monitoring unit 802 may be configured to perform monitoring by analyzing the one or more data elements in the datastore. In yet another embodiment, monitoring unit 802 may be configured to perform monitoring by analyzing an input to the application performing the one or more masking operations. The input may be originated from one or more of a user and another application. In still yet another embodiment, monitoring unit 802 may be configured to perform monitoring by analyzing one or more logs corresponding to one or more of, but not limited to, the datastore, an application performing the one or more masking operations and an operating system supporting the datastore.

System 800 further comprises an identification unit 804 configured to monitor the one or more metadata associated with the one or more masking operations. The one or more metadata associated with a masking operation of the one or more masking operations may include, but is not limited to, masking status of at least a part of the one or more data elements, time of performing the masking operation, a type of masking algorithm corresponding to the masking operation, a degree of the masking operation, an identifier associated with the one or more data elements a name of an application performing the masking operation and a context of the masking operation. The type of masking algorithm may include one or more of, but not limited to, Character de-identification, Compose math expression de-identification, Custom de-identification, Date Synch de-identification, Email policy de-identification, Expression de-identification, Format Preserve de-identification, Full Name de-identification, Intelli-Mask de-identification, National Provider Id de-identification, Name Synch de-identification, Regular Expression de-identification, Sequence de-identification, Shuffle de-identification, Static de-identification, and Random de-identification. The preceding types of masking algorithms are explained in further detail in the appendix. The identifier associated with the one or more data elements may include, but is not limited to, a datastore type identifier, a table identifier, a row identifier and a partition identifier. The context of the masking operation may include one or more of, but not limited to, a transaction identifier associated with the masking operation, identity of an owner of the one or more data elements, identity of a user initiating the masking operation. Identification unit 804 may be configured to perform identification of the one or more metadata by analyzing a result of the monitoring.

Further system 800 comprises a watermark table creation unit 806 configured to create a watermark table. The watermark table may comprise the one or more metadata. Additionally, the watermark table may comprise location information corresponding to the one or more data elements. For example, the location information may include one or more of, but not limited to, a database name, an IP address, a socket number, a table identifier, a column identifier and a row identifier. Additionally, system 800 comprises a recording unit 808 and one or more security controllers such as for example a first security controller and a second security controller (not shown in FIG. 8). Recording unit 808 may be configured to record the watermark table at the first security controller. The first security controller may be configured to mediate functions such as, but not limited to, copying the one or more metadata and storing the one or more metadata. For example, tools such as but not limited to, a processing script, Information Lifecycle Management (ILM) tool, and an Extract Transform Load (ETL) tool may use the first security controller to perform one or more of, to one or more of retrieve, store and update the watermark table. Further system 800 comprises an updating unit 810 configured to update the one or more metadata in one or more of the first security controller and a second security controller. In some embodiments, updating unit 810 may update one or more of the watermark table and the pointer table in the datastore. In an exemplary scenario, one or more masking operations may be performed on the one or more data elements in the datastore by one or more of, but not limited to, a user and an application. Thereafter, the updating unit 810 may update the one or more masking operations performed on the one or more data elements to the first security controller through an Application Programming Interface (API). In another exemplary scenario, the one or more data elements may be copied to the destination by a second security controller. Thereafter, the updating unit 810 may update the watermark tables in the first controller with the one or more metadata associated with the one or more data elements that is copied to the second security controller. The API may be of the form updateWatermark (DBlocation, DBname, DBIdentifier1, DBIdentifier2, . . . , Maskinfo1, Maskinfo2 . . . ). The field DBlocation may indicate the location of the datastore containing the one or more data elements subjected to masking. The field DBname may indicate the name given to the datastore containing the one or more data elements subjected to masking. Further, the API may include a number of DBIdentifiers that provide information regarding the exact location of the one or more data elements subjected to masking. Finally, the API may include one or more Maskinfo fields that represent the properties of the one or more masking operations.

Further, system 800 may comprise the second controller configured to mediate the generation of a copy of the one or more data elements. The system 800 may comprise a communication unit which may be situated in the second security controller (not shown in FIG. 8). The communication unit may share the watermark table recorded in the first security controller to the second security controller, thereby updating the watermark table associated with the one or more masking operations in the second security controller. The communication unit may share the watermark table recorded in the first security controller to the second security controller using an API.

The foregoing embodiments disclosed herein track one or more masking operations on one or more data elements in a datastore by recording one or more metadata associated with the one or more masking operations. The one or more metadata may be copied along with the datastore to a destination when at the one or more data elements are copied to the destination. As a result, the one or more metadata information is made available at the destination.

It will be appreciated that embodiments of the methods and systems described herein may be comprised of one or more conventional transaction-clients and unique stored program instructions that control the one or more transaction-clients to implement, in conjunction with certain non-transaction-client circuits, some, most, or all of the functions of a method for masking of one or more data elements. The non-transaction-client circuits may include, but are not limited to, a radio receiver, a radio transmitter, signal drivers, clock circuits, power source circuits, and user input devices. As such, these functions may be interpreted as steps of methods for tracking masking of one or more data elements. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing description, although the steps corresponding to various flow charts are described in a certain sequence, a person skilled in the art would appreciate that the steps may be performed in any other appropriate sequence without departing from the scope of the methods and systems disclosed herein.

Those skilled in the art will realize that the above-recognized advantages and other advantages described herein are merely exemplary and are not meant to be a complete rendering of all of the advantages of the various embodiments of the methods and systems.

In the foregoing specification, specific embodiments of the methods and systems have been described. However, one of ordinary skill in the art appreciates that various modifications and changes can be made without departing from the scope of the methods and systems. Accordingly, the specification and figures are to be regarded in an illustrative rather than a restrictive sense, and all such modifications are intended to be included within the scope of the methods and systems. The benefits, advantages, solutions to problems, and any element(s) that may cause any benefit, advantage, or solution to occur or become more pronounced are not to be construed as a critical, or required.

Appendix

1. Character de-identification algorithm: In character de-identification algorithm, a selected character is used to replace character positions on right or left of a field in order to obscure a number of characters specified. The characters may form a part of one or more data elements. If the field is shorter than the number of characters specified then all characters are de-identified. Here, one or more pre-defined parameters may additionally include de-identification character to use, a side indicator (L for Left, R for right) and the number of characters to de-identify.
2. Compose de-identification algorithm: In compose algorithm, one or more data elements may be pulled from other columns and rows of a datastore in order to generate a de-identified data element. Here, one or more pre-defined parameters may additionally include column identifier, row identifier, start position, length of the one or more data elements and type of connector.
3. Compose math expression de-identification algorithm: In compose math expression de-identification algorithm, one or more data elements are pulled from other columns and rows of a datastore in order to generate a de-identified data element using simple math. Here, one or more pre-defined parameters may include column identifier, row identifier and an operator.
4. Custom de-identification algorithm: Custom de-identification algorithm involves one or more of pre-setting 1-5 with a fixed call to a pre-named routine, de-identifying a single column, one row at a time, de-identifying a single row, one column at a time, de-identifying a single column in all rows at a time and de-identifying a single row in all columns at a time.
5. Date Synch de-identification algorithm: Date Synch de-identification algorithm allows keeping one time zone/timestamp in sync with another time zone/timestamp. The method can be applied regardless of the data type of the two columns as long as they contain valid data for conversion
6. Email policy de-identification algorithm: Email policy de-identification algorithm allows building an email ID to replace an existing one in row of a column based on the content of other columns in the same row of a table, usually the first and last names of a person represented in that row.
7. Expression de-identification algorithm: Expression de-identification algorithm allows de-identifying one or more data elements by expression. This enables incrementing or decrementing base values in source column of one or more tables into a target column of the one or more tables by either a value or percentage. Further, a value may be generated based on minimum and maximum values.
8. Format Preserve de-identification algorithm: Format preserve de-identification algorithm provides a de-identified data element corresponding to a data element having the same format as the data element. Here, alphabetic characters are de-identified as A-Z values by preserving the same case. Numbers are de-identified as numbers. Special characters are retained without change.
9. Full Name de-identification algorithm: Full Name de-identification algorithm allows to generate a full name using name lookups assembled based on a format of existing data elements. A format model as shown below may be employed if a first name or last name cannot be identified.
L=Last Names
F=First Names (or Middle names (M))
I=Initial (or first initial (FI) or middle initial (MI))
P=Prefix
S=Suffix
,=Comma
.=period, if after FI or MI it will put a period after each initial, otherwise just a single period.
All other characters may be treated as literals (including spaces) and just inserted into an output data element.
Cases may be U for upper, L for lower or default is I for Initcap (Capitalized). Precedence controls may also be employed if (L) location is more important or (W) word type (found as a last/first name lookup) is more important.
10. Intelli-Mask de-identification algorithm: Intelli-Mask de-identification algorithm allows complex assembly of a new field using regular expressions against the right, left or centre of existing data elements with a specified starting position.
11. National Provider Id de-identification algorithm: National Provider Id de-identification algorithm allows specifically de-identifying National Provider Id and bio metric identification data with valid data of the same type.
12. Name Synch de-identification algorithm: Name Synch de-identification algorithm allows synchronizing two name columns in one or more tables. This involves parsing a source column of one or more tables to identify a name and providing one or more de-identified data elements to a target column of the one or more data elements using the format preserving de-identification algorithm. A format model as shown below may be employed if a name cannot be identified.
L=Last Names
F=First Names
FI=First Initial
M=Middle Names
MI=Middle Initial
N=Nicknames
P=Prefix
S=Suffix
,=Comma
All other characters may be treated as literals (including spaces) and just inserted into an output data element.
Typical names may be written in a form of P F M L S or L, P F M S. Cases may be U for upper, L for lower or default is I for Initcap (Capitalized). Precedence controls may also be employed if (L) location is more important or (W) word type (found as a last/first name lookup) is more important.
13. Regular Expression de-identification algorithm: Regular Expression de-identification algorithm allows de-identifying a field using a regular expression in order to generate a de-identified data element.
14. Sequence de-identification algorithm: Sequence de-identification algorithm allows generating a sequence based on a start value, an increment value. The method shuffles the generated list to scramble the assignment to the target column in a table.
15. Shuffle de-identification algorithm: Shuffle de-identification algorithm shuffles column values between rows in the same table.
16. Static de-identification algorithm: Static de-identification algorithm allows de-identification of data with a static text overlay.
17. Random de-identification algorithm: Random de-identification algorithm is used to de-identify different data types as shown below:
   i. Address Line 1: Here, an address line with street number, name and type is generated.
   ii. Address Line 2: Here, a # or Suite number is generated.
   iii. City: Here, a random city or town name is generated.
   iv. Country: Here, a random country name or country code is generated.
   v. Credit Card Number: Here, a random credit card number is generated. The random credit card number is generated based on the type, numbers and characters of the original credit card.
   vi. Email Address: Here, a random email address is generated.
   vii. First and Last Name: Here, a random first and last name is generated from a list.
   viii. Random String: Here, a random text string is generated.
   ix. Social Security Number (SSN): Here, a random SSN is generated based on a specific rule set.
   x. Telephone Number and Zip Code: Here, random telephone numbers and zip code are generated with valid area code.
   xi. Type Appropriate: Here, an appropriate type of value for the field type (char for char, date for date, number of number, etc.) is generated.

What is claimed is:

1. A method of tracking masking of one or more data elements in a datastore of a server, the method comprising:
monitoring one or more masking operations associated with the one or more data elements;
identifying one or more metadata corresponding to the one or more masking operations;
generating a watermark table comprising at least a portion of the one or more metadata at a first security controller;
creating a pointer table in the datastore, the pointer table comprising one or more pointers to the one or more metadata in the watermark table;
generating a copy of at least a part of the one or more data elements in the datastore and a copy of at least a portion of the pointer table at a destination having security operations controlled by a second security controller;
communicating the watermark table containing the at least a portion of the one or more metadata between the first security controller and the second security controller;
setting the second security controller to access the pointer table in the datastore; and
wherein the one or more metadata are selected from the group consisting of a masking status of at least a part of the one or more data elements, a time of performing the masking operation, a type of masking algorithm corresponding to the masking operation, a degree of the masking operation, an identity of an application performing the masking operation, and a context of the masking operation.

2. The method of claim 1 further comprising:
copying at least a part of the one or more data elements to a destination; and
copying the one or more metadata associated with the at least a part of the one or more data elements to the destination.

3. The method of claim 1 further comprising storing one or more source identifiers in the watermark table, wherein the one or more source identifiers are associated with an original source corresponding to the one or more data elements.

4. The method of claim 3 wherein, the recording comprises storing the watermark table within the datastore.

5. The method of claim 1 further comprising performing one or more of an update operation on the watermark table and a read operation on the watermark table, wherein one or more of the update operation and the read operation are performed through an Application Programming Interface (API).

6. A system for tracking masking of one or more data elements in a datastore of a server, the system comprising:
a monitoring unit configured to monitor one or more masking operations associated with the one or more data elements;
an identification unit configured to identify one or more metadata corresponding to the one or more masking operations;
a watermark table creation unit configured to generate a watermark table comprising at least a portion of the one or more metadata at a first security controller;
a pointer table in the datastore, the pointer table comprising one or more pointers to the one or more metadata in the watermark table;
a propagation unit to generate a copy of at least a part of the one or more data elements in the datastore and a copy of at least a portion of the pointer table at a destination having security operations controlled by a second security controller;
a communication unit to send the watermark table containing the at least a portion of the one or more metadata between the first security controller and the second security controller, the second security controller set to access the pointer table in the datastore; and
wherein the one or more metadata are selected from the group consisting of a masking status of at least a part of the one or more data elements, a time of performing the masking operation, a type of masking algorithm corresponding to the masking operation, a degree of the masking operation, an identity of an application performing the masking operation, and a context of the masking operation.

7. The system of claim 6 further comprising the watermark table creation unit configured to store one or more source identifiers in the watermark table, wherein the one or more source identifiers are associated with an original source corresponding to the one or more data elements.

8. The system of claim 6 further comprising one or more of an updating unit configured to perform an update operation on the watermark table and a reading unit configured to perform a read operation on the watermark table, wherein one or more of the update operation and the read operation are performed through an Application Programming Interface (API).

9. A computer-readable medium comprising computer-executable instructions for tracking masking of one or more data elements in a datastore of a server, the computer-executable instructions when executed by at least one processor, cause the at least one processor to:
monitor one or more masking operations associated with the one or more data elements;
identify one or more metadata corresponding to the one or more masking operations;
generate a watermark table comprising at least a portion of the one or more metadata at a first security controller;
create a pointer table in the datastore, the pointer table comprising one or more pointers to the one or more metadata in the watermark table;
generate a copy of at least a part of the one or more data elements in the datastore and a copy of at least a portion of the pointer table at a destination having security operations controlled by a second security controller;
communicate the watermark table containing the at least a portion of the one or more metadata between the first security controller and the second security controller;
set the second security controller to access the pointer table in the datastore; and
wherein the one or more metadata are selected from the group consisting of a masking status of at least a part of the one or more data elements, a time of performing the masking operation, a type of masking algorithm corresponding to the masking operation, a degree of the masking operation, an identity of an application performing the masking operation, and a context of the masking operation.

10. A computer readable medium of claim 9 comprising computer-executable instructions, the computer executable instructions when executed by the at least one processor, cause the at least one processor to store one or more source identifiers in the watermark table, wherein the one or more source identifiers are associated with an original source corresponding to the one or more data elements.

11. A computer readable medium of claim 9 comprising computer-executable instructions, the computer executable instructions when executed by the at least one processor, cause the at least one processor to perform one or more of an update operation on the watermark table and a read operation on the watermark table, wherein one or more of the update operation and the read operation through an Application Programming Interface (API).

* * * * *